United States Patent
Tadman et al.

(10) Patent No.: US 9,141,640 B2
(45) Date of Patent: Sep. 22, 2015

(54) METHODS AND SYSTEMS OF ADVANCED REAL ESTATE SEARCHING

(75) Inventors: Frank P. Tadman, Saratoga, CA (US); Evelyn Horng, Los Altos, CA (US)

(73) Assignee: MLSListings, Inc., Sunnyvale, CA (US)

( * ) Notice: Subject to any disclaimer, the term of this patent is extended or adjusted under 35 U.S.C. 154(b) by 909 days.

(21) Appl. No.: 12/500,576

(22) Filed: Jul. 9, 2009

(65) Prior Publication Data

US 2010/0094548 A1     Apr. 15, 2010

Related U.S. Application Data

(60) Provisional application No. 61/079,409, filed on Jul. 9, 2008.

(51) Int. Cl.
| | | |
|---|---|---|
| G01C 21/00 | (2006.01) | |
| G06F 17/30 | (2006.01) | |
| G01C 21/36 | (2006.01) | |
| G06Q 10/04 | (2012.01) | |
| G06Q 50/16 | (2012.01) | |

(52) U.S. Cl.
CPC .......... *G06F 17/30241* (2013.01); *G01C 21/36* (2013.01); *G06Q 10/047* (2013.01); *G06Q 50/16* (2013.01)

(58) Field of Classification Search
CPC .......... G06Q 30/0641; G06Q 30/0643; G06Q 50/16; G06Q 30/06; G06Q 30/00; G06Q 30/0633; G06Q 30/0639; G06F 17/3087; G09B 29/007; G01C 21/3679; G01C 21/3682

USPC ......... 701/409, 140, 454, 455, 457, 461, 459, 701/532; 707/758; 715/202, 204; 705/313, 705/26.1; 345/630; 340/995.24

See application file for complete search history.

(56) References Cited

U.S. PATENT DOCUMENTS

| | | | |
|---|---|---|---|
| 5,032,989 A * | 7/1991 | Tornetta | 705/313 |
| 5,802,492 A * | 9/1998 | DeLorme et al. | 455/456.5 |
| 6,343,290 B1 * | 1/2002 | Cossins et al. | 1/1 |
| 6,385,541 B1 | 5/2002 | Blumberg et al. | |
| 6,385,622 B2 | 5/2002 | Bouve et al. | |
| 6,415,291 B2 | 7/2002 | Bouve et al. | |
| 6,484,176 B1 | 11/2002 | Sealand et al. | |
| 6,597,983 B2 * | 7/2003 | Hancock | 701/520 |
| 6,636,803 B1 * | 10/2003 | Hartz et al. | 701/459 |
| 7,174,301 B2 | 2/2007 | Florance et al. | |
| 7,826,965 B2 * | 11/2010 | Sadri et al. | 701/438 |
| 7,881,948 B2 * | 2/2011 | Carr et al. | 705/1.1 |
| 8,019,532 B2 * | 9/2011 | Sheha et al. | 701/420 |
| 8,051,089 B2 * | 11/2011 | Gargi et al. | 707/758 |
| 8,135,505 B2 * | 3/2012 | Vengroff et al. | 701/24 |
| 8,533,217 B2 * | 9/2013 | Imler et al. | 707/769 |

(Continued)

*Primary Examiner* — Thomas G Black
*Assistant Examiner* — Sze-Hon Kong
(74) *Attorney, Agent, or Firm* — Wilson Sonsini Goodrich & Rosati

(57) ABSTRACT

The invention provides systems and methods for advanced features for online mapping, searching, and planning driving tours. A multiple listing service (MLS) system may include a map search feature. A user interface for a real property listing may include a geographic map, which may enable a user to define a destination search area. The destination search area may be displayed on the geographic map. The MLS system may enable a user to conduct a search utilizing spatial and/or non-spatial filters. A search entry interface may be provided on a user interface in conjunction with the geographic map. The geographic map and map search features may also be able to include additional geographic information.

28 Claims, 9 Drawing Sheets

(56) References Cited

U.S. PATENT DOCUMENTS

| | | | |
|---|---|---|---|
| 8,577,602 B2* | 11/2013 | Walder | 701/426 |
| 8,788,431 B1* | 7/2014 | Shao et al. | 705/313 |
| 2003/0014402 A1 | 1/2003 | Sealand et al. | |
| 2003/0064705 A1 | 4/2003 | Desiderio | |
| 2003/0182052 A1* | 9/2003 | DeLorme et al. | 701/201 |
| 2004/0021584 A1* | 2/2004 | Hartz et al. | 340/995.24 |
| 2004/0073538 A1* | 4/2004 | Leishman et al. | 707/3 |
| 2004/0080510 A1* | 4/2004 | Inokuchi et al. | 345/440 |
| 2004/0260465 A1* | 12/2004 | Tu | 701/209 |
| 2005/0003801 A1 | 1/2005 | Randall et al. | |
| 2005/0086158 A1 | 4/2005 | Clare | |
| 2005/0091218 A1 | 4/2005 | Janes et al. | |
| 2005/0231392 A1* | 10/2005 | Meehan et al. | 340/995.1 |
| 2005/0288958 A1* | 12/2005 | Eraker et al. | 705/1 |
| 2005/0288959 A1 | 12/2005 | Eraker et al. | |
| 2006/0105342 A1* | 5/2006 | Villena et al. | 435/6 |
| 2006/0190279 A1* | 8/2006 | Heflin | 705/1 |
| 2006/0259872 A1* | 11/2006 | Mullen et al. | 715/764 |
| 2007/0005373 A1* | 1/2007 | Villena et al. | 705/1 |
| 2007/0064018 A1* | 3/2007 | Shoemaker et al. | 345/660 |
| 2007/0067104 A1 | 3/2007 | Mays | |
| 2007/0150292 A1 | 6/2007 | Nichols | |
| 2007/0168211 A1* | 7/2007 | Arnebeck | 705/1 |
| 2007/0263648 A1* | 11/2007 | Driver | 370/411 |
| 2008/0051989 A1* | 2/2008 | Welsh | 701/208 |
| 2008/0104027 A1* | 5/2008 | Imler et al. | 707/3 |
| 2008/0163073 A1* | 7/2008 | Becker et al. | 715/753 |
| 2008/0168369 A1 | 7/2008 | Tadman et al. | |
| 2008/0183597 A1* | 7/2008 | Veerappan et al. | 705/27 |
| 2009/0030707 A1* | 1/2009 | Green | 705/1 |
| 2009/0055094 A1* | 2/2009 | Suzuki | 701/209 |
| 2009/0063232 A1* | 3/2009 | Lissack et al. | 705/8 |
| 2009/0132316 A1 | 5/2009 | Florance et al. | |
| 2009/0265340 A1* | 10/2009 | Barcklay et al. | 707/5 |
| 2010/0026718 A1* | 2/2010 | Jetha et al. | 345/647 |
| 2011/0106429 A1* | 5/2011 | Poppen et al. | 701/201 |
| 2014/0201093 A1* | 7/2014 | Bishop et al. | 705/315 |

* cited by examiner

| Feature/ Use Case | Agent | Broker Rep | Appr | Appr Rep | Consumer | MLSL CSR | MLSL CSR Escal. | MLSL Mktg | MLSL Sub Svcs | MLSL General | Assistant | Third Party Dev |
|---|---|---|---|---|---|---|---|---|---|---|---|---|
| Use Map Search | F | F | F | F | X | F | F | F | F | F | X* | X |
| Draw custom radius to filter listings | F | F | F | F | X | F | F | F | F | F | X* | X |
| Save custom radius filtered listings | F | F | F | F | X | F | F | F | F | F | X* | X |
| Draw custom polygon to filter listings | F | F | F | F | X | F | F | F | F | F | X* | X |
| Save custom polygon filtered listings | F | F | F | F | X | F | F | F | F | F | X* | X |
| Recall saved map search | F | F | F | F | X | F | F | F | F | F | X* | X |
| Edit saved map search and save as new search (from Map Search view) | F | F | F | F | X | F | F | F | F | F | X* | X |
| Manage "Saved Search" for geo-filtered searches (from Saved Search view) | F | F | F | F | X | F | F | F | F | F | X* | X |

Key:  F = Full Access   P = Partial Access   X = No Access   * Except through assisting another user who has access

Fig. 2

METHODS AND SYSTEMS OF ADVANCED REAL ESTATE SEARCHING

CROSS-REFERENCE

This application claims the benefit of U.S. Provisional Application No. 61/079,409, filed Jul. 9, 2008, which application is incorporated herein by reference in its entirety.

BACKGROUND OF THE INVENTION

Various technologies have been developed that provide map-related services. Internet sites are available that provide maps, directions for traveling to a desired destination from a specified starting point, and other map- or navigation-related services. Conventional Internet mapping services, and the like, may provide a means by which a user can input a location which may be displayed on a map. A user may input another location in order to determine driving routes and provide driving directions to and from the first location to the second. However, a need exists for a multiple listing system that plans driving tours with real property listings as the destination.

Furthermore, various real estate sites have included mapping features. For example, a conventional real estate site may enable a user to view the location of a property listing on a map. However, conventional real estate sites fail to provide many features that may assist with searching for property listings based on geographic information or location.

Accordingly, there is a need for a method or system to provide multiple listing services with geographic mapping features from a computer-based system that provides such features.

SUMMARY OF THE INVENTION

The invention provides systems and methods for advanced features for online mapping, searching, and planning driving tours. Various aspects of the invention described herein may be applied to any of the particular applications set forth below or for any other type of online mapping system. The invention may be applied as a standalone system or method, or as part of an application, such as real estate or multiple listing service. It shall be understood that different aspects of the invention can be appreciated individually, collectively, or in combination with each other.

An aspect of the invention may be directed to a multiple listing service (MLS) system, which may include a graphical user interface. The graphical user interface may show real estate search results on a display device. The MLS graphical user interface may comprise a destination list with at least two real property listing destinations, and a geographic map displaying a destination search area, including at least one destination indicator within the destination search area corresponding to the location of at least one real property listing destination on the destination list.

In accordance with another aspect of the invention, an MLS graphical user interface may include a search entry interface with a plurality of real property search criteria to be determined by a user. The MLS graphical user interface may also include a geographic map adjacent to the search entry interface, displaying a user-defined spatial search filter.

The invention also provides a method for searching multiple listings, in accordance with an aspect of the invention. Such a method of search may include displaying a geographic map on an interactive display device; receiving, from a user, an input for determining a destination search area; displaying, on the geographic map, the destination search area; receiving, from the user, one or more search criteria; and displaying, on the geographic map, at least one destination indicator that meets the one or more search criteria and is displayed within the destination search area.

Some embodiments of the invention may provide a computer readable medium containing program instructions for searching real estate listings within a specified geographic filter comprising computer code that displays a geographic map on an interactive display device; computer code that receives, from a user, an input for determining the specified geographic filter; computer code that receives, from the user, one or more search criteria; and computer code that displays, on the geographic map, at least one destination indicator that meets the one or more search criteria and is located within an area defined by the specified geographic filter, and that displays a destination list comprising at least one real property listing corresponding to the at least one destination indicator.

Other goals and advantages of the invention will be further appreciated and understood when considered in conjunction with the following description and accompanying drawings. While the following description may contain specific details describing particular embodiments of the invention, this should not be construed as limitations to the scope of the invention but rather as an exemplification of preferable embodiments. For each aspect of the invention, many variations are possible as suggested herein that are known to those of ordinary skill in the art. A variety of changes and modifications can be made within the scope of the invention without departing from the spirit thereof.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 2 shows a table with examples of various user access rights.

DETAILED DESCRIPTION OF THE INVENTION

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

I. System/Setup

Figure 1:
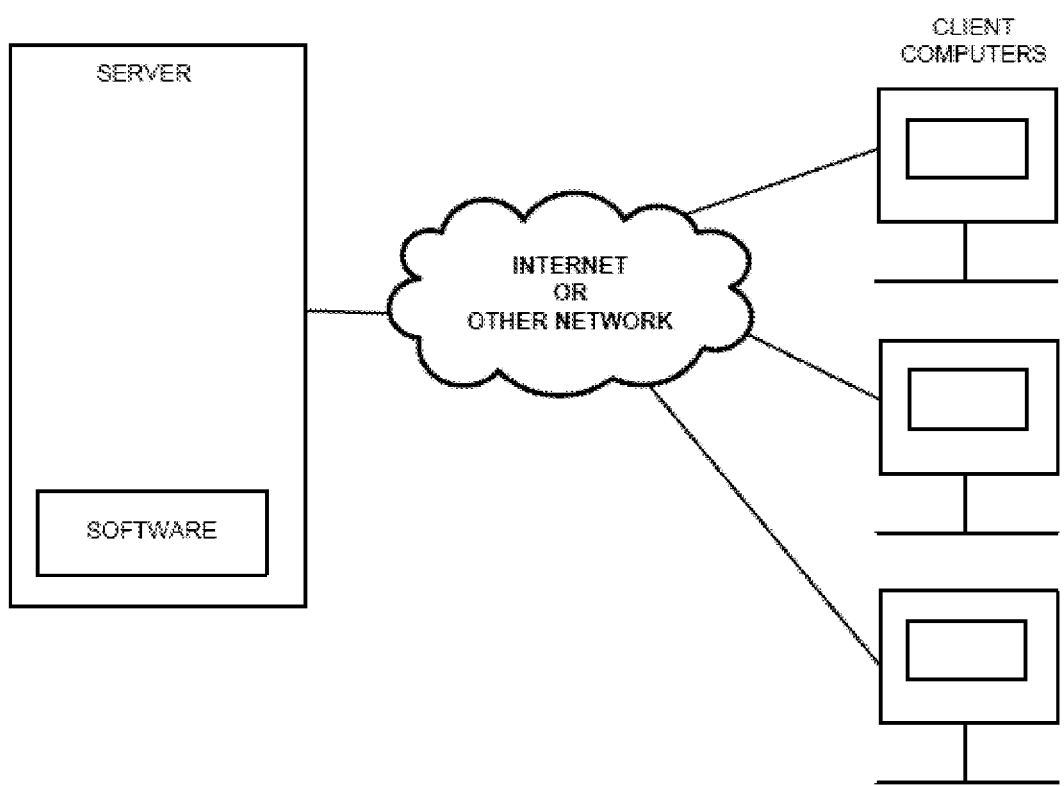
FIG. 1 shows a system with client computers interacting with a server over a network.

A multiple listing service (MLS) system may include a user interface provided in accordance with the invention herein, which may be displayed across a network such as the Internet. For example, as shown in FIG. 1, an implementation may include a client computer comprising a video display with at least one display page comprising data. The data may include real property data, which may include data relating to real estate listings, other multiple listing service data, or so forth.

A user interface of an MLS system may be shown on a video display. Video displays may include devices upon which information may be displayed in a manner perceptible to a user, such as, for example, a computer monitor, cathode ray tube, liquid crystal display, light emitting diode display, touchpad or touchscreen display, and/or other means known in the art for emitting a visually perceptible output. Video displays may be electronically connected to a client computer according to hardware and software known in the art.

In one implementation of the invention, a display page may include a computer file residing in memory which may be transmitted from a server over a network to a client computer, which can store it in memory. A client computer may receive computer readable media, which may contain instructions, logic, data, or code that may be stored in persistent or temporary memory of the client computer, or may somehow affect or initiate action by a client computer. Similarly, one or more servers may communicate with one or more client computers across a network, and may transmit computer files residing in memory. The network, for example, can include the Internet, any other wide area network (WAN), a local area network (LAN), or any network for connecting one or more clients to one or more servers. In some alternate embodiments, a client computer need not interact with a server, but may be self-contained.

Any discussion of a client computer may also apply to any type of networked device, including but not limited to a personal computer, server computer, or laptop computer; personal digital assistants (PDAs) such as a Palm-based device or Windows CE device; phones such as cellular phones or location-aware portable phones (such as GPS); a roaming device, such as a network-connected roaming device; a wireless device such as a wireless email device or other device capable of communicating wireless with a computer network; or any other type of network device that may communicate over a network and handle electronic transactions. Any discussion of a client computer may also apply to any interactive display device, which need not be networked, but which may include a display and receive an input from a user. Any discussion of any device mentioned may also apply to other devices.

At a client computer, the display page may be interpreted by software residing on a memory of the client computer, causing the computer file to be displayed on a video display in a manner perceivable by a user. The display pages described herein may be created using a software language known in the art such as, for example, the hypertext mark up language ("HTML"), the dynamic hypertext mark up language ("DHTML"), the extensible hypertext mark up language ("XHTML"), the extensible mark up language ("XML"), or another software language that may be used to create a computer file displayable on a video display in a manner perceivable by a user. Any computer readable media with logic, code, data, instructions, may be used to implement any software or steps or methodology. Where a network comprises the Internet, a display page may comprise a webpage of a type known in the art.

A display page according to the invention may include embedded functions comprising software programs stored on a memory, such as, for example, VBScript routines, JScript routines, JavaScript routines, Java applets, ActiveX components, ASP.NET, AJAX, Flash applets, Silverlight applets, or AIR routines.

A display page may comprise well known features of graphical user interface technology, such as, for example, frames, windows, tabs, scroll bars, buttons, icons, menus, fields, and hyperlinks, and well known features such as a "point and click" interface. Pointing to and clicking on a graphical user interface button, icon, menu option, or hyperlink also is known as "selecting" the button, icon, option, or hyperlink. Additionally, a "point and gesture" interface may be utilized, such as a hand-gesture driven interface. Any other interface for interacting with a graphical user interface may be utilized. A display page according to the invention also may incorporate multimedia features.

A user interface may be displayed on a video display and/or display page. A server and/or client computer may have access to MLS software. A user interface may be used to display or provide access to real property data.

For example, a user interface may be provided for a web page or for an application. An application may be accessed remotely or locally. A user interface may be provided for an object, application, or software.

The MLS system may be compatible with various web browsers. For example, the MLS system may be compatible with web browsers such as Internet Explorer, Firefox, Mozilla, Netscape, Safari, Konqueror, Opera, or America Online. In various embodiments of the invention, any web browser that may be known or later developed in the art may be supported. A user may interact with an MLS system on a web browser on the user's client computer, or any other device.

The MLS system may display and/or download objects in any order. The display/download speed may vary depending on the system. For example, users who access mapped results for the previous system through a 56k modem may see results after a lag, such as a 90 second lag, due to a previous synchronous download and display design (everything displays at the same time.)

Another design approach may be to leverage dynamic asynchronous download that displays sets of information, and which may allow users to interact with a specific set of data (like viewing the map) while waiting for other information to catch up (like roll-overs of property listings). This may enable a system to specify which sets of data to download first in order to assist with rapid user access.

Based on this approach, one example of a preferred order of display and performance for that display may be as follows:

(1) Initial launch to map results page showing the interactive map graphic and the list of property data for up to 100 listings on that page, may be less than 2 or 3 seconds on a T1-LAN. (a) Starting at this point, users can interact with the map via zooming, panning, and in the future drawing a custom shape on the map. (b) Starting at this point, there may be no visible delay for the display of listings deselected/hidden by the user in map results (as is the experience in some situations involving synchronous downloads). (2) Each individual status flag with the associated rollovers can be streamed asynchronously in after the map loads. This may take no more than 2 more seconds on a T1-LAN to complete up to 100 flags with rollover data behind them. Users who access mapped results with DSL or cable modem may see delays of less than 5 seconds. Any time estimations or order of display are provided by way of example only, and may vary in accordance with a plurality of embodiments.

A system may specify the preferred order of download or display, which may vary. For example, instead of having the flags load after the map loads, a system may have the flags load before the map loads. In alternate embodiments of the invention, rather than having a set preferred order of display, a system may determine a desired download order based on interactions with the user. For example, if the system determines that a user has a fast connection, the order of display may differ from if the system determines the user has a slow connection. In another example, the system may determine that a user may be more interested in rollover features than zooming and panning based on previous user interactions, and may display those features earlier.

II. Mapping Solutions

In accordance with one aspect of the invention, a multiple listing service (MLS) may incorporate a mapping function. In some embodiments, the MLS mapping function may utilize a pre-existing mapping application, while in other embodiments, the MLS mapping function may utilize a custom mapping application. For example, an MLS may use a Microsoft Map Point/Virtual Earth solution. In another example, other mapping solutions, such as a TeleAtlas/ERSI mapping solution, Mapquest, Google maps, or any other mapping solution platform known or later developed may be used. The mapping solutions may assist with displaying a geographic map and/or handling geographic information in an MLS application.

An MLS software may utilize any features of a mapping solution that it may be utilizing. For example, if the MLS software is utilizing Virtual Earth, it may also utilize affiliated technologies. In some instances, a mapping function may have the ability to pan, zoom, and display 2D/road; and each property listing may be denoted by a current flag design showing the order number and status of the listing. Thus, in some embodiments, an MLS software may include a geographic map, which may be integrated with a pre-existing map feature, and optionally with a pre-existing toolbar.

In accordance with some embodiments, the system may not use the standard out-of-the-box Microsoft Virtual Earth toolbar that allows users to zoom in and out, pan, as well as view by 2D, 3D, Birds eye, current traffic conditions, etc. In some embodiments, products that coexist with an existing map technology may be modified when a new map technology is implemented. For example, due to concerns over how status flags would be displayed in a 3D or Bird's eye view, accommodations may be made. Rather, the system may display a subset of the standard toolbar—which would be zoom, pan, 2D, Road, Aerial, and Hybrid. The default view could be 2D/Road. In alternate embodiments of the invention, the system may use the Microsoft Virtual Earth toolbar, or any pre-existing toolbars of the software platform the system is using, which may include additional options for controlling the map.

In some embodiments, flags may be "modernized" by configuring the Virtual Earth flag with the system order numbers and status colors.

In the development of the MLS systems, parity migration may occur from one mapping platform to another (e.g., from TeleAtlas/ERSI to Microsoft Map Point/Virtual Earth). Therefore in some embodiments, parity migration may include the replacement of any mapping platform with another mapping platform. In some instances, a parity migration may not contain any new functionality. The primary objective may be technology migration and regression testing. In other embodiments, a migration may enable new functionalities that may not be available with a previous technology.

An MLS system may utilize more than one mapping solution. For example, an access-only version of an MLS system may utilize Virtual Earth, while a public site may utilize MapQuest. In such a situation, a consumer view from email alerts may continue to point to MapQuest.

III. Searching—Shape and Data layers

In accordance with an aspect of the invention, a user may use an MLS system to search real property listings. A user may be anyone capable of interacting with the MLS system. In some instances, the MLS system may have an access-only component provided to subscribers and may have a public component available to any party. Alternatively, the MLS system may be accessible to subscribers only, or may be completely accessible to the public.

A user may include a subscriber of an MLS software. For example, a subscriber may include agents and appraisers who may use the system to search properties. This may include an agent, broker representative, appraiser, appraiser representative, and all internal MLS users. Subscribers may also include special users who have standard access like duplicates, teams, associations, and assessors. This may or may not include special users who have a subset of access like assistants.

A user may also include any member of the public that may access an MLS software. For example, prospective buyers or sellers of real property may have partial or complete access to an MLS software.

Users may utilize an MLS software in any manner. For example, a user may regularly track trends in the housing market by downloading specific information from the MLS into their own analytical tools (often a spreadsheet that segments SFR, condo, multi-family, etc. in their areas of focus). A user may also pair searches with specific consumer requirements, saves them for easy access, and emails alerts to consumers. A user may also use an MLS for planning; for example, from list of prospective listings, route planning to optimize review of homes. An MLS software may include mapping, which may be useful for CMA and farming functions, and may include radius or geographical filter for CMA and farming; route planning; and saved geo-filters. An MLS software may also be used to identify market trends, such as price appreciation by geographic area and the average number of days (e.g., Average Days on Market) it takes to sell a property by geographic area. To support these functions, an MLS system supports searching of historical listings (past listings of property that has already sold).

Different users may have access or not have access, or have limited to access to certain features. FIG. 2 provides a table of one example of how different users may have different levels of access for various features. For example, an agent may have full access to all the features while a consumer may have no access. However, this table is not limiting, and any user of the system may have any level of access to various features, whether as designated by the system as a preset category, or as individually specified.

In some instances an MLS application may provide a plurality of access portals, e.g., one for agents and one for prospective buyers. Thus, an MLS application may have a separate subscribers-only interface and a public interface. Alternatively, an MLS application may have only a single portal that may be accessible by all parties, which may or may not limit access to certain parts of the MLS application.

A. MLS Systems

An MLS system may provide a user with an ability to search real property listings. In preferable embodiments, the system may utilize a spatial search (aka, e.g., geospatial search, spatial filter, geospatial filter). A spatial search may be a search or filter based on a shape or geographical marking. For example, a spatial search may be search or filter based on a user-defined destination search area, which may include boundaries. A destination search area may be formed of shapes that may be custom drawn by the user. Alternatively, the search area may be formed of shapes that may be preselected or chosen by a user. For example, the custom shapes may be a custom circle/radius, or a custom polygon with up to 10 points (or any other number of points). However, custom shapes may also include a custom shape with a defined radius, where the user may select a custom shape which may or may not be a circle. Also, custom shapes may include a custom polygon which may or may not have a limited number of points. Additionally, custom shapes may include a shape drawn free-hand by a user—which may be similar to a draw function that does not require points of a polygon.

An MLS system may also enable a user to search real property listings by using a non-spatial search or non-spatial filter. Such a non-spatial search or filter may be based on data fields pertaining to characteristics and attributes of a real property listing, such as the number of bedrooms, bathrooms, square footage, price, etc.

In accordance with an embodiment of the invention, an MLS system may enable a user to conduct a joint query by using both spatial and non-spatial searches. For example, a user may search by radius, polygon, or custom shape filters as a joint query with property listing attributes. Thus, a map search or a geographic filtering may be incorporated as a search option within various searching applications.

Figure 3:
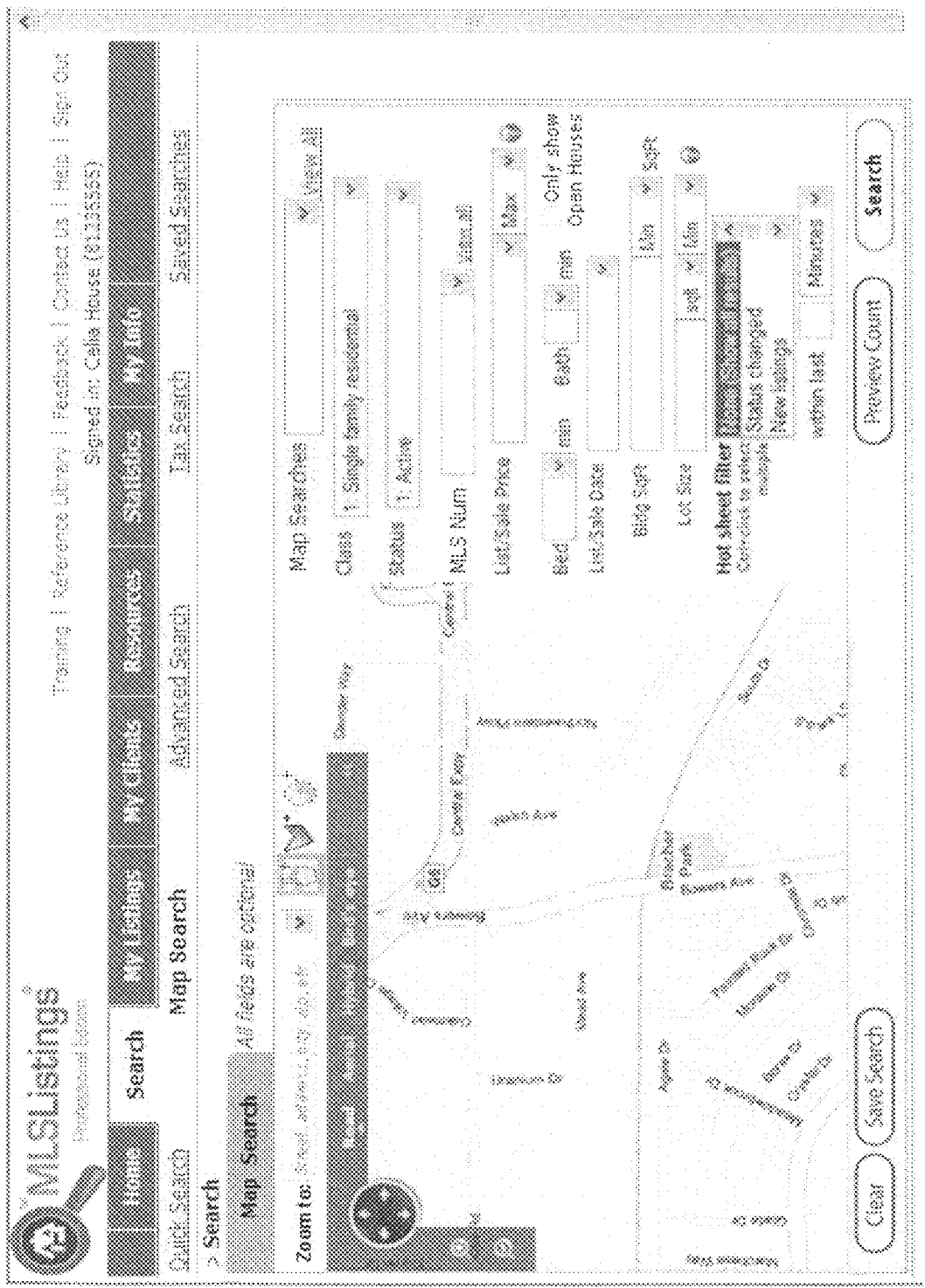
FIG. 3 shows an example of a real estate searching tool including a search entry interface and a geographic map.

An MLS graphical user interface may include features for both spatial and non-spatial searching. FIG. 3 shows an example of a real estate searching tool including a search entry interface and a geographic map. A geographic map may assist with spatial searching. A search entry interface may assist with non-spatial searching. For example, a search entry interface may include input fields or other user interface tools that may enable a user to select or enter search criteria. In some instances, the search entry interface may include a plurality of real property search criteria to be determined by the user.

In some embodiments, a search entry interface may be adjacent to the geographic map. For example, a user interface may be provided where a search entry interface is to the right, left, above, or below the geographic map. In other embodiments, the search entry interface need not be immediately adjacent to the geographic map, but may be displayed within the same user interface or page. Alternatively, the search entry interface may be displayed on a different page or may be provided as a pop-up to the geographic map, or vice versa. The geographic map may display a user-defined spatial search filter.

In some instances, having a map and destination list on one page, or having a map and a search entry interface one page could clutter a user interface. However, the user interface provided in the MLS system may provide listing blurbs, or address blurbs that provide only selected amounts of information, as opposed to a detailed listing record. For example, a destination list may only show basic information about the destination. Thus, a geographic map and a search entry interface may be provided on a single page.

In one embodiment of the invention, a user interface may include various map control features. For example, tools, such as those that may enable a user to select a custom polygon or custom radius may be included in a control toolbar, which may include other features such as zooming, panning, and viewing the map through different views, such as a road view, aerial view, hybrid view or bird's eye view, etc. A user may be able to zoom in and out and/or pan using the controls. In some instances, a user may be able to pan a map by clicking and dragging as well. In some instances, such navigational controls may be provided in a minimal display that may take up little space. A tool may be provided that may enable a user to enter an address or location, and that may automatically zoom and/or center the map at that location. The user can see a measurement index at foot of map.

A map may show only major street names and exclude side streets that are not helpful in determining where a property is located. Alternatively, it may be specified (by the user or system) whether the maps show the side streets. It may also be specified (by the user or system) whether the map shows any other geographic features that may be helpful for determining property location or surroundings. For example, the map may show gas stations as a landmark.

As previously discussed, aerial maps may be used, which may utilize satellite, aircraft, or other imagery. This may or may not be used in conjunction with a road/street view and/or other views, such as a topographic view, geological information view, zoning view, etc.

A control toolbar may be reflective of the mapping software platform that is being used, or may be displayed independently of the mapping platform. For instance, if an MLS system is utilizing a particular mapping solution, a control toolbar may be provided by the mapping solution.

In another example, a user interface may include a fourth navigational bar as shown in FIG. 3. For example, custom shape tools, such as those that may enable a user to create a custom polygon or custom radius on a map may be in a separate toolbar, which may or may not be located near the other map control toolbars.

The various features of the navigational bars may be located in any manner to enable a user to control the map view.

As previously discussed, a map search function may be provided as part of an MLS system or software. A map search function may be integrated into any part of the system or software and may be accessible from any page. For example, a sub-tab for map search may be provided. This may be under a general search tab, between other search options (e.g., quick search and advanced search).

A map may have a default view and/or default zoom level. For example, the beginning location view may be set to a City/ZIP from other search frames, the subscriber's office location, the subscriber's county point of center, the subscriber's home, or any other location, which may be selected by the subscriber. The no-input default location may be the center of a specified location, such as a user-defined default, or a local county. The user can save one or more specific default locations from a user preferences or by clicking "default" from the search screen. Any additional locations could be managed under a "saved search" function.

Any mapping features known or later developed in the art may be used, see, e.g., http://www.socalmls.com and http://www.johnlscott.com, which are hereby incorporated by reference in their entirety.

Figure 4:
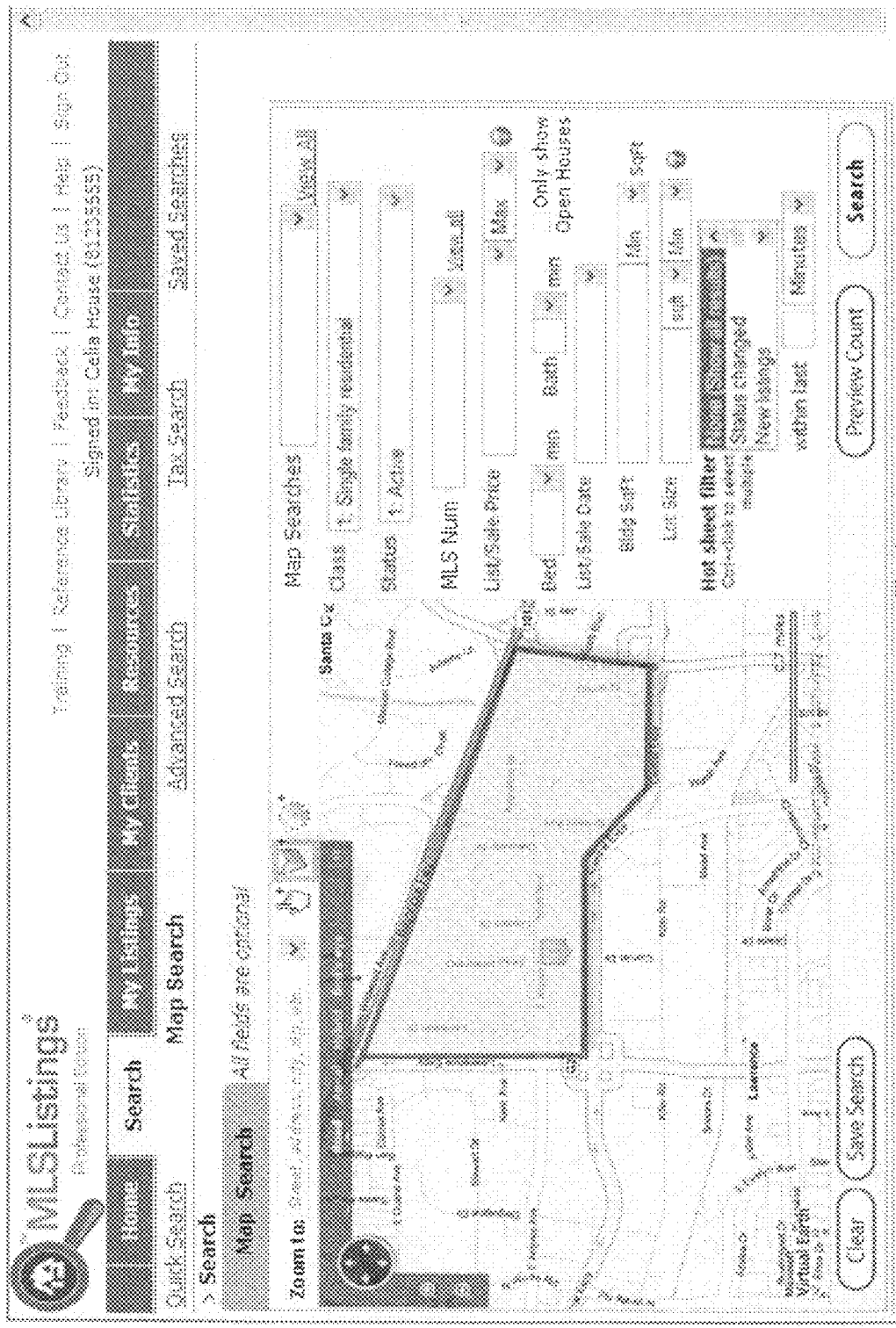
FIG. 4 shows a real estate searching tool including a search entry interface, and a geographic map with a destination search area.

FIG. 4 shows a real estate searching tool including a search entry interface, and a geographic map with a destination search area. A destination search area may be visibly displayed on the geographic map. In some instances, the borders of a destination search area may be visibly marked on the geographic map. For example, a line may be displayed on the map defining the borders. In some instances, the area defined by the destination search area may be shaded or otherwise visually marked. For example, if the destination search area is defined by a particular shape, the area within the shape may be shaded if the destination search area is within the shape, or the area outside the shape may be shaded if the destination search area is the area excluded from the shape.

A MLS software may include a polygon tool that may enable a user to select an area on a map by creating a polygon and enclosing an area on the map within the polygon, as shown in FIG. 4. The polygon tool may be used to define the destination search area. The system may enable a user to search within the selected area. In some embodiments of the invention, the polygon may have a limited number of points that may be selected. For example, a polygon may be limited up to four, five, six, seven, eight, nine, ten, twelve, fifteen, twenty, or fifty points or fewer. In other embodiments, there may be no limit to the number of points on a polygon that may be selected.

In some embodiments, the lines between the points of the polygons may be straight lines. In other embodiments the lines between points may conform to streets if the points are close to defining portions of streets. In some embodiments, the lines between the points may be automatically determined by the system, while in other embodiments, the user may draw or adjust the lines between the points.

The user can free-hand a polygon from which to filter property listings. In some embodiments, the user may create a polygon with a specified number of points. In some cases, the polygon may have an unlimited number of points. Alternatively, as previously discussed, the polygon may have a limited number of points, such as having up to 10 points. In other embodiments, a user may free-hand a shape, which may not be a polygon with points, but rather may be a line drawn free-hand. For example, a user may manipulate a pointing device, such as a computer mouse pointer, to draw the free-hand shape. The default may be to include only listings within the shape or line, and a user may select an option to be able to exclude from the shape, or vice versa. The destination search area may also be user-defined in any other way (by drawing or by entering in values that correspond to the area).

In some embodiments, the destination search area may be pre-defined. For example, a user may enter in a zip code, neighborhood, city, division, school district, or any other geographic information that the user may wish to search within. In some instances, based on the selected geographic information, the system may generate a corresponding destination search area. For example, a user may not necessarily know the boundaries of a particular zip code or school district, but the system may be able to incorporate that information and display the corresponding destination search area on the geographic map. Any other geographic information may be incorporated in generating a destination search area. For example, a user may wish to search a particular area with a crime rate not exceeding a particular threshold, or within a certain amount of distance from a gas station or supermarket. The corresponding destination search area may be automatically generated and/or displayed on the geographic map. Thus, such destination search areas may be predetermined by the system, or may be based on geographic information or criteria defined by the user.

Figure 5:
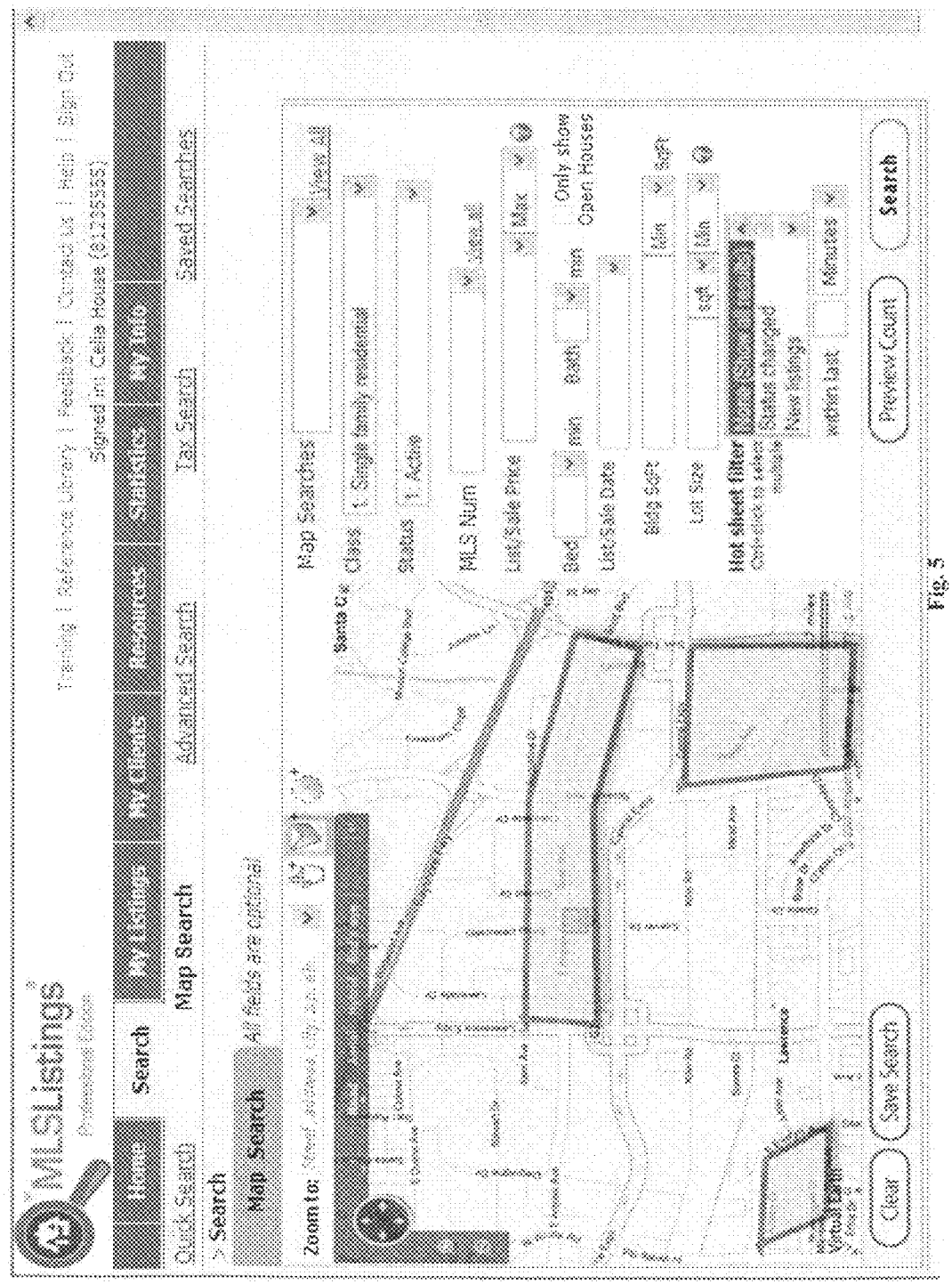
FIG. 5 shows a real estate searching tool with a search entry interface with a plurality of search criteria, and a geographic map with discontinuous destination search areas.

FIG. 5 shows a real estate searching tool with a search entry interface with a plurality of search criteria, and a geographic map with discontinuous destination search areas. As previously discussed, destination search areas may be visibly displayed on the geographic map. The borders and/or area defining a destination search area may be shown. A destination search area may be defined as a continuous area (e.g., the area within a shape, or outside a shape). A destination search area may also include discontinuous areas (e.g., the areas within a plurality of shapes, or outside a plurality of shapes).

The MLS system may enable a user to select one or more shape on the map to be searched. For example, the system may enable a user to select a limited number of shapes on the map, such as three, four, five, ten, or more shapes, as illustrated in FIG. 5. The selected shapes may or may not overlap. In other implementations, there may be no limit to the number of shapes that a user may select to be searched. The total number of shapes may include different types of custom shapes—which may include custom polygons, custom radii, or any other shape that a user may select on the map, whether it be by freehand drawing, selecting a preset shape, or by any other tool.

When there are multiple shapes selected on a map, a user may search for listings within any of the shapes simultaneously. A user may also search for listings in areas excluded from these shapes. In some embodiments, shapes may be nested within one another. This may allow a user to search within the larger outer shape, while excluding one or more inner shape within the outer shape. In some instances, the default may be filter for search results only within the shape (rather than excluded from the shape).

Figure 6:
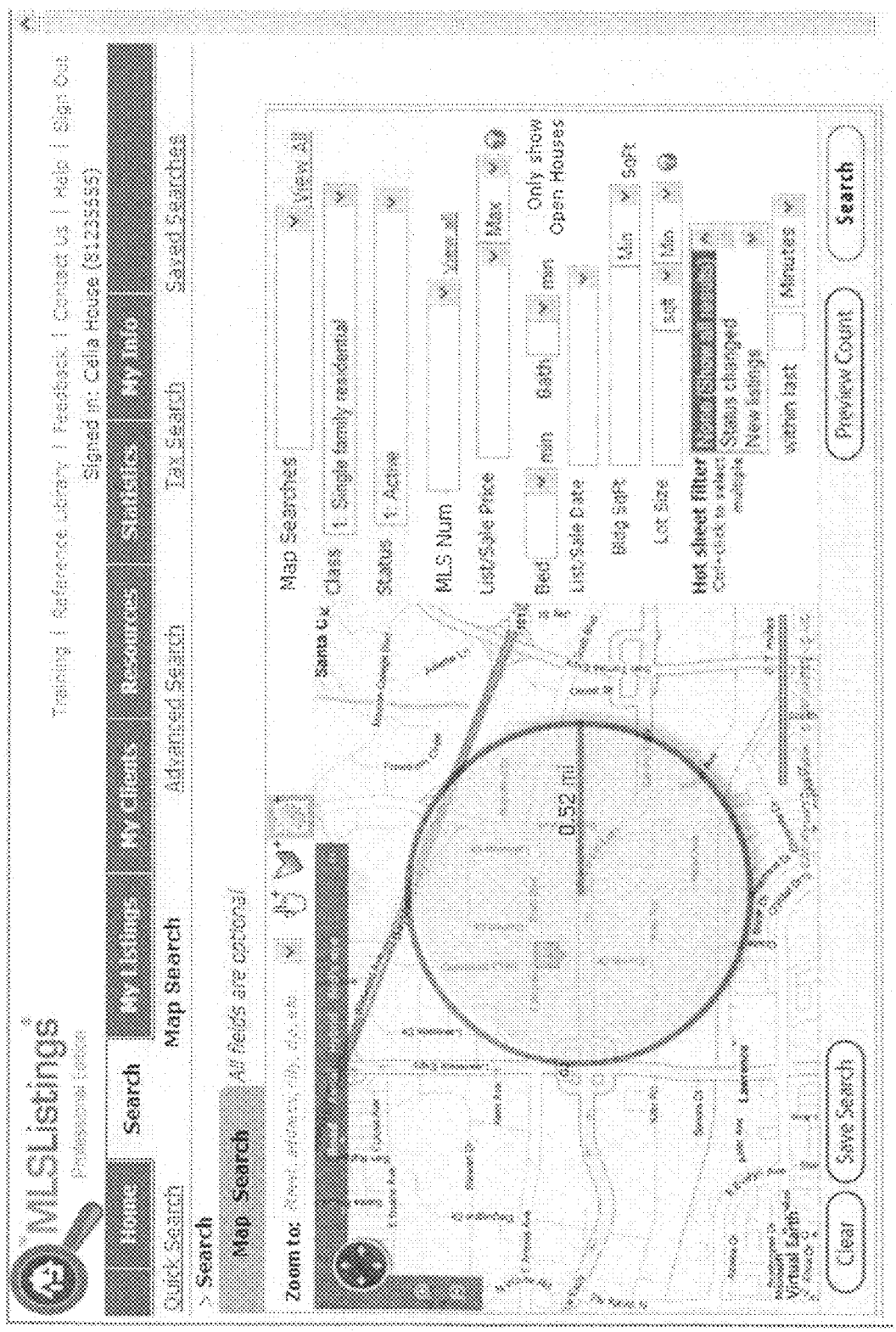
FIG. 6 shows a user interface with a search entry interface and a geographic map with a circular destination search area.

FIG. 6 shows a user interface with a search entry interface and a geographic map with a circular destination search area, in accordance with an embodiment of the invention. The circular destination search area may be formed using a radius tool. A circular destination search area may be displayed with a boundary and/or shading to indicate the area covered by the destination search area. The circular destination search area may also include a radius marking which may indicate the radius of the area.

An MLS system may include a radius tool. This may enable a user to select a shape such a circle and specify the radius. The radius may be the distance from center. For example, a user may select a radius and select the center by entering coordinates or by clicking on a location, which may give a user a custom circle, as illustrated below. In some embodiments, the radius tool may be limited to circles. In other embodiments, a user may be able to select a shape, such as a square, triangle, hexagon, octagon, or other polygon, and specify the radius and location.

In some implementations, the radius of the shape may be visible on the user interface. In other implementations, the location of the center of the shape may also be visible or indicated on the map. In some cases, the radius of the shape may be visible in distance units, such as miles or kilometers, while a user is determining the size of the shape (i.e. dragging the shape) and may or may not still be visible once the size is determined (i.e. the user releases the shape). In some instances, a user may enter the location of the center of the shape and/or the radius, which may cause the shape to be visible. The user may adjust the shape by modifying the values relating to the shape location and/or radius, or by clicking and dragging the shape.

Figure 7:
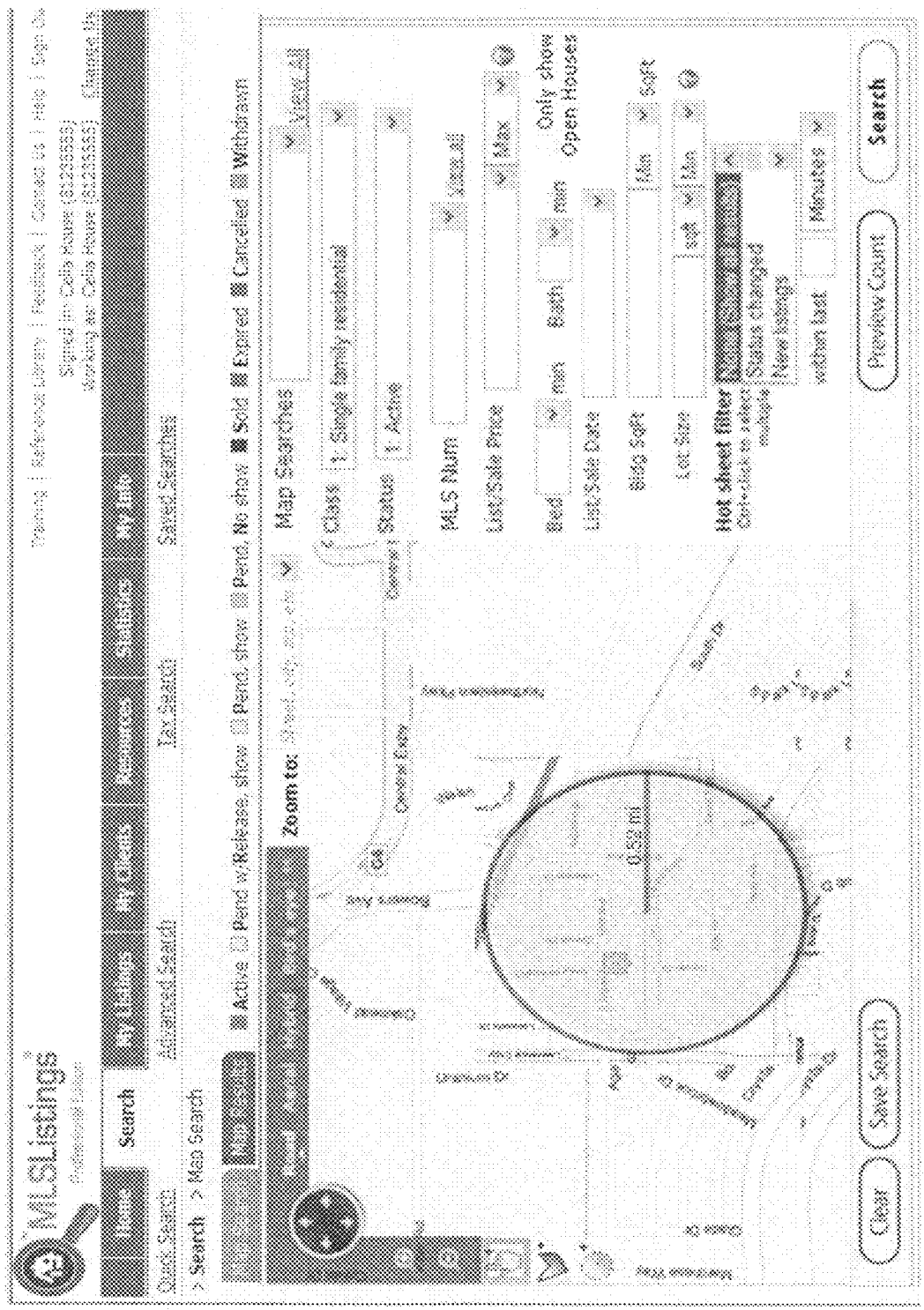
FIG. 7 illustrates another example of a user interface with a search entry interface and a circular destination search area.

FIG. 7 illustrates another example of a user interface with a search entry interface and a circular destination search area. For any of the user interfaces of a real property listing tool displaying a geographic map and/or search entry interface, may include a status index. The status index may show examples of various real property statuses, including but not limited to: active; pending with release, show; pending, show; pending, no show; sold; expired; cancelled; or withdrawn.

Figure 8:
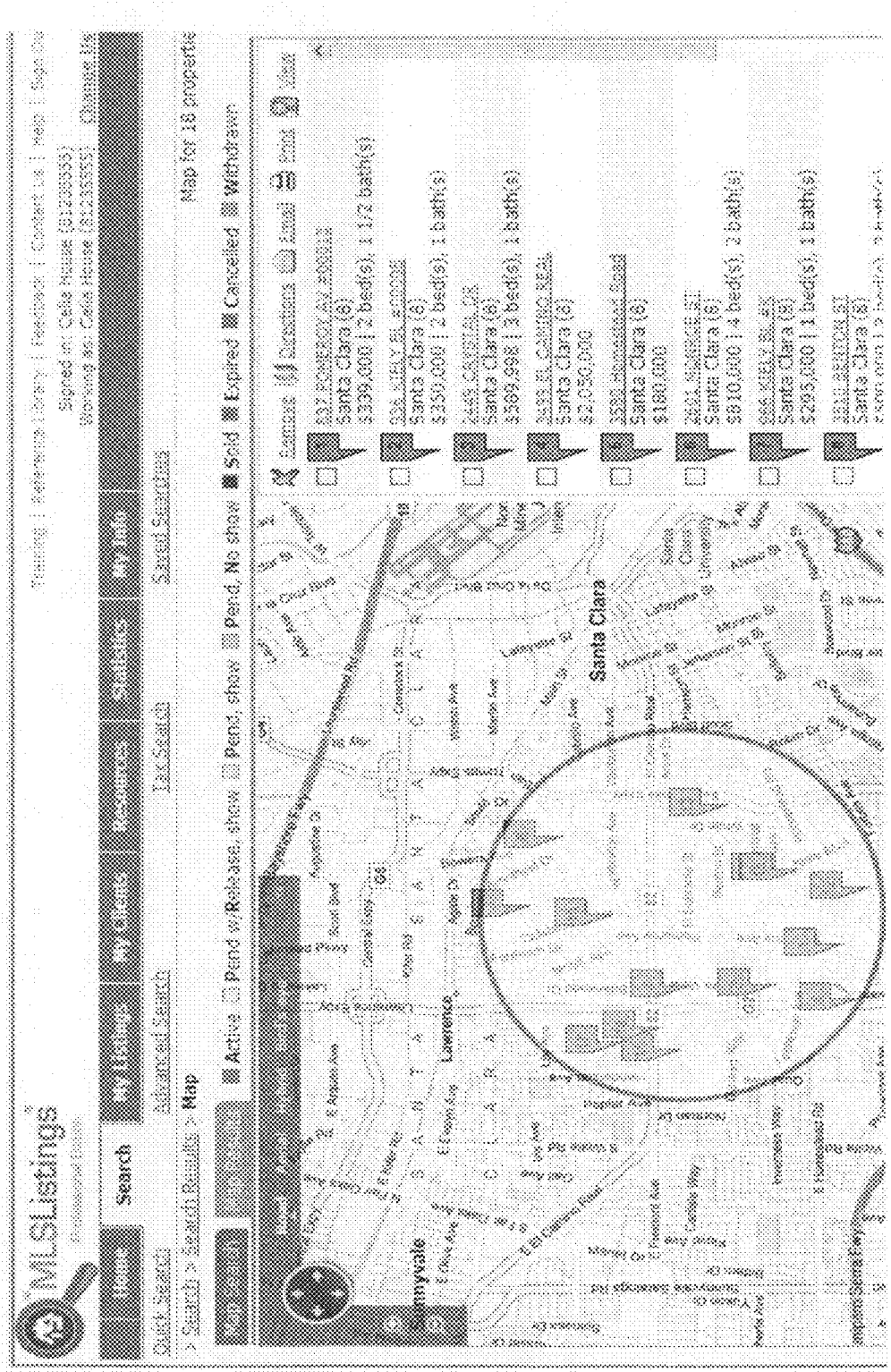
FIG. 8 shows a graphical user interface comprising a destination list, and a geographic map with destination indicators corresponding to the destinations listed.

FIG. 8 shows a graphical user interface comprising a destination list, and a geographic map with destination indicators corresponding to the destinations listed. The graphical user interface may display the map search results, after a destination search area and/or selection criteria have been selected. The graphical user interface showing search results may include a destination list with at least two real property listing destinations and a geographic map displaying a destination search area. The geographic map may include at least one destination indicator within the destination search area corresponding to the location of at least one real property listing destination on the destination list.

A user may be able to search within selected areas for listing results. For example, a user may be able to search within a circle with a given radius, and the results within the circle may be displayed. When searching, a user may be able to combine spatial and non-spatial criteria, as previously discussed. For example, a user may include spatial data such as a selected area. In one embodiment, the selected area may be a destination search area that may be defined by a circle, polygon, or custom shape. Such destination search areas may be formed of a continuous shape or one or more discontinuous shapes. The selected areas may also be inside or outside spatial search boundaries.

The user may also include non-spatial criteria which may include information about the listing such as desired square footage, lot square footage, number of bedrooms, number of bathrooms, property status, property type, price range, list/sale date, etc. For instance, a user may be searching for a single family residential house with four bedrooms and two bathrooms within a price range from $200,000 to $500,000 within a selected circle of particular radius.

Conducting a search may direct a user to a map results page, which may show the selected shape with flags indicating the positions of the listings found within the area. For example, as shown in FIG. 8, a search may yield 18 results that fall within the desired area and numbered flags may appear on a map to show the location of the results, while a corresponding list on the side may show the addresses of the results. The corresponding list may include numbered flags that correspond to the numbered flags on the map. Such flags may be color-coded to represent different statuses of properties, whether they are active, sold, etc. Such statuses may be specified during a search.

Any other destination indicator or marker known in the art may be used to indicate property listings that meet the spatial and/or non-spatial criteria. The destination indicator or marker may have any shape or configuration known in the art including but not limited to pins, arrows, etc. In some embodiments, each of the property listings may correspond directly to a destination indicator. Alternatively, only some of the property listings may be displayed (e.g., the top five, or the ones within a particular area). In some instances, user interaction with a destination indicator may cause additional information about the real property listing denoted by the destination indicator to be displayed. In some embodiments, the additional information can be customized by the user to select the information and presentation most relevant to his or her needs. This customization can be associated with a saved search so that the best presentation is automatically provided whenever that saved search is re-performed. Since one user may have several saved searches, each used for a different purpose, this allows the relevant information to be displayed instantly without the user having to describe it each time.

In some embodiments, after conducting a search, a user may toggle back to a map search view. In some embodiments the map search views and map results views may be shown as tabs that a user may switch between. Other user interfaces known in the art may be used to display a map search and map results view for a user, including but not limited to arrows, separate windows, links, etc.

In some embodiments, a map results view may also include additional geographic information, which may be integrated into the geographic map. Some examples of such geographic information may include school district boundaries, demographic information, heat maps, parcel boundaries, tax information, zoning information, geological information, topological information, or any other geographic information. Such geographic information may be provided or displayed as data layers.

A user may return to a map search view, which may show the selected areas and non-spatial criteria that may be used to search. In some embodiments of the invention, a user may be able to modify the selected areas. For example, if a user wished to change the radius of a circle, a user may be able to click on the circle and drag it to increase or decrease the size. Similarly, a user may be able to move a shape or circle by clicking on it and dragging it to a different location on a map. Other means to change size or location of a shape may be used as known in the art, such as changing a radius value for the shape that will change the radius of the corresponding shape on the map, or selecting new coordinates for the center or start of the shape.

A user may be able to modify custom shapes in other manners. For example if a user had a custom polygon, a user may select a point and click and drag it to a new place to modify the shape of the custom polygon. Any tools known in the art for drawing or modifying shapes may be used to modify or interact with selected areas on the map.

A user may also be able to add additional shapes to an existing map or remove selected areas from the map. A map search view may also have an option that may enable a user to clear existing selections from a map. For example, a user can click on a button that may erase all the selected areas from a map, leaving it clear for a user to make new selections if the user desires.

After selected areas on a map may be modified, a user may perform additional searches within the newly modified selected areas.

A user may also be able to save a search. For example, if a user selects several areas on a map and wishes to save that selection, a user may save the search, and be able to recall it at a later time. A MLS software may be able to save an unlimited number of searches or may have a limited number of searches that may be saved. A MLS software may enable a user to select a name to save the search under, or may automatically assign a search identifier.

From a map search a view, a user may be able to preview a count from a search. For instance, a user may be able to see how many listings will show up with the designated spatial and non-spatial criteria. This may enable a user to adjust the criteria as desired before performing an actual search.

A user may be able to conduct different types of searches. For example, a user may conduct a quick search which may not allow a user to specify all the criteria, a map search which may enable a user to specify spatial and non-spatial criteria, an advanced search which may provide additional criteria and features, or a tax search. A user may also access saved searches.

In accordance with an embodiment of the invention, any shape-filtered search may be saved. Any spatial and/or non-spatial search may be saved in a "saved search" feature which may be recalled at a later time. A joint query, including spatial and non-spatial searches may be included. Thus, a user may perform and save one or more (user defined radius or custom polygon) shapes per search.

Thus, a user may be able to save the search criteria from a shape-filtered search in a graphical representation, and be able to repeat this criteria for updated listings under a "saved search" feature. In some embodiments, the user can save any number of shapes per search. In other embodiments, a user may be limited in the number of shapes saved, such as saving up to 3 shapes per search.

When a user accesses a saved search, the user may be able to modify the existing search criteria. For example, pulling up an existing search may populate a geographic map with the saved destination search areas, and the search entry interface with the selected search criteria. The user may modify the existing information (e.g., modifying, adding, or deleting destination search areas and/or search criteria).

A geographic map of an MLS system may incorporate other geographic information. See, e.g., http://neighborhoods.realtor.com/CA/San-jose/Cupertino/412378/Summary, which is hereby incorporated by reference in its entirety. For example, a geographic map may display information, such as school district boundaries, demographic information, heat maps, parcel boundaries, tax information, topographic information, underlying geological information, or zoning information. In some instances, additional geographic information may be gathered from additional sources of information.

In some embodiments, additional information provided on a geographic map, such as additional geographic information, may be displayed and/or stored as data layers. The system may allow a user to expose data layers such as nearby schools, parcels, and tax data integration with parcels In some instances, the additional geographic information may assist a user in creating a destination search area. For example, a user may wish to create a destination search area that may coincide with a school district boundary. The geographic map may have an option that may enable a user to select the school district boundary as the destination search area, or that may allow a destination search area to be created that may automatically conform to the school district boundary. In another example, a user may wish to create a destination search area, where the underlying land may exceed a particular elevation. Thus, a user may select the desired elevation, and the destination search areas may be created accordingly. In another example, a user may wish to search for particular zoning areas, and the destination search areas may automatically conform to the desired zoning areas.

In some instances, the additional geographic information, may also be utilized by a non-spatial filter. For example, when searching, the destination search area may be selected without consideration to a zoning area, but a user may enter a desired zoning area into the search entry interface.

B. Methods of Map Search Use

In accordance with some embodiments of the invention, methods may be provided of conducting real property searches utilizing an MLS system. Any of the methods described herein are provided by way of example only, and any of the steps or features discussed may be optional or interchangeable with other steps or features.

In one example, a method for searching multiple listings may include displaying a geographic map on an interactive display device; receiving, from a user, an input for determining a destination search area; displaying, on the geographic map, the destination search area; receiving from the user, one or more search criteria; and displaying, on the geographic map, at least one destination indicator that meets the one or more search criteria and is displayed within the destination search area. Determining a destination search area may include at least one of the following: destination search area coordinates, destination search area radius, destination search area shape, and clicking and dragging the geographic map.

1. Conducting a Search

A general set of steps that may be utilized in conducting a search is outlined below:

| Use Map Search | Draw custom radius --> | Save custom radius search >> | Recall and manage saved custom shape search |
|---|---|---|---|
| | Draw custom polygon --> | Save custom polygon search | |

Map Features

Standard subscribers (or other users) may be able to access a map search option. An MLS system may include other search functionalities (e.g., quick search, map search, advanced search, tax search, and saved searches).

The beginning location view for the map may be set to a default view. In some examples a default view may include a zoom level showing the street map of either: (1) a City/ZIP carried over from another search frame; (2) a City/ZIP from the user's last search; (3) the user's stored default "zoom to" field; or (4) user's association's county point of center—e.g. SILVAR shows Santa Clara county center, SAMCAR shows San Mateo county center, and REIL shows Santa Clara county center; or (5) the center of a MLS software, such as MLSListings "home" service area. In some embodiments, the order of preference for a default view may be provided in the order listed, while in other embodiments, the order of preference for a default view may be different.

In one scenario, a user may see a map with 0 search results. Their call to action may include:
  Zoom To: field that allows them to enter in an address to re-center the map, keeps last 5 addresses in History, and on user action stores one address as default
  Pan tool is selected on default (to drag map's point of center)
  Default to 2D street view
  Ability to Zoom in and out on map view (with corresponding changes to distance measurement at map footer)
  Ability to select 2D Aerial, Hybrid, or Birds eye view
  Radius tool for defining custom radius filter
  Polygon tool for defining custom polygon shape filter
  Quick Search frame and if applicable, any fields that have been pre-populated during that session. (need to discuss UI placement of Quick Search frame)
  Recall a "Saved Search"
  Standard buttons: Clear, Preview Count, Save Search, and Search The user may pan/drag a map to a desired location, a zoom to desired view, and/or enters an address in a "zoom to" field. The user may then click on a spatial filter tool. For example, a user may click on a radius tool or on a polygon tool. After the search is run, the user interface may flow to existing map results.

Alternatively, a user may enters quick search fields, and click a search option. The map may show results on listings that meet search criteria. User can then "save search" as available today.

An MLS system may store new spatial and non-spatial fields, including the last 5 (or any number of) addresses in zoom to field, one or more default address selected by the user (from zoom to), or an address from user's last search (if not already stored).

Radius Search Tool

In some instances, a user may select a radius tool during a map search to determine a destination search area. When a user selects the radius tool, they may draw a custom circle on the map. In some implementations, a user may draw a custom shape, not necessarily limited to a circle, that they may choose on the map. User may be able to combine this custom radius filter with property listing attributes from a quick search to show only listings that meet both spatial and non-spatial filters. In some instances, the user may combine this customer radius filter with property listing attributes meeting the search criteria within a search entry interface, which may be provided in the same user interface as the geographic map.

In a preferable embodiment, a user may left click to create a center of a circle, and drag the mouse to create length of radius. In some implementations, the length in miles (or any other units of distance) may show up on line while mouse is clicked. The user may release click and create a custom radius (which may or may not still show length in miles), and the map may automatically pan to center of the radius.

In an alternate embodiment, a user may click to create a center of a circle. A pop up may be displayed allowing the user to enter a radius length in miles. This may result in a circle showing up on the map, and the map may automatically pan to center of radius.

The user may create a destination search area using a radius tool using other techniques. For example, a user may select a starting point (which may be the center) of the shape. The user may also specify the radius by entering a value and clicking and dragging. In some instances, after a shape has been formed, it may be modified by clicking and dragging, or by entering or modifying measurement values.

Generally, the steps to conduct the search may involve the following: (1) A user may draw a custom radius on the map. (2) The user may enter some property attributes, such as bedrooms, bathrooms, square footage, etc. The property attributes may be entered into a search entry interface. (3) The search may return joint spatial and non-spatial results onto a map results page with the custom radius outline displayed. (4) The user can delete specific listings in the destination list results, and corresponding changes may be reflected in the geographic map. However, in some instances, the custom radius outline may still be displayed. The map results image can be interactive, allowing the user to resize their custom radius and refine their search based on new spatial information, keeping the non-spatial filter the same, and still not display any "hidden" deselected properties. (5) The user can repeat steps 1-4 additional times for multiple shapes. In some embodiments, a user may repeat steps 1-4 two additional times for a total of 3 shapes. In some implementations, the user can mix radius and polygon shapes. In some cases, there may be a set total of shapes, such as 3, or the number of shapes may be unlimited. (6) The user can redo the search, save this search, or go to other existing functions, such as driving directions, CMA, etc.

In some embodiments, a search results page may have the following sub-tabs or provide access to the following features: list view, picture view, and map view. Each view may show joint query of custom shape filter and selected property listing attributes. The map view may show (interactive) map with a list of properties. In some instances, default columns shown for list of properties may include: checkbox, status, address, list price, bed, bath, square footage, DOM, city, and hide.

Saving Radius Search

A user may be able to save a joint query of custom radius and listing attributes. If only the custom radius is defined, then only the spatial filter may be saved. The user interface may include a user interactive field for saving a search. For example, a saved search drop down could include a "thumbnail" of the shape and map location.

Prior to saving a radius search, a user may have completed a custom radius search and may be showing results from either the spatial search alone, or the joint filter of spatial and non-spatial attributes. The radius tool may be activated.

The user may click a "save search" option. If the radius tool is activated, the MLS could save this as a spatial query along with its non-spatial data filters. A user may select a save search option from any number of locations, such as a search results screen, or a search screen. A saved search list may be provided. In some instances, the saved search list may be provided as a drop down list.

Example of information relating to a search that may be saved when the search is saved may include the latitude and longitude of the center of a circle, and the length of the radius. In some instances, a limit may be provided on the number of shapes that may be stored (radius or polygon). Alternatively, an unlimited number of shapes may be stored. A saved search may also include non-spatial data associated with the saved search. Saved joint filters are stored in existing "Saved Search" list and can be manipulated.

Custom Polygon Search Tool

In some instances, a user may select a custom polygon tool during a map search to determine a destination search area. When user selects a polygon tool, they will be able to draw a custom polygon on the map. In some instances, the polygon may have a limit of up to 10 points, or any other number of points, while in other instances, the polygon may include an unlimited number of points. User is able to combine this custom Polygon filter with property listing attributes from Quick Search (tbd from UI design) to show only listings that meet both spatial and non-spatial filters.

In a preferable embodiment, the user may left click to create the first point, release click and move mouse to extend the side, and clicks again for second point. This may be repeated for the desired number of points. The user may double clicks to end drawing (see example at http://www.har.com, which is hereby incorporated by reference in its entirety). In some instances, the map may automatically pan to center of polygon, zoomed in to polygon shape.

In some cases, as the user drags the mouse to create sides, length in miles or other distance units such as kilometers, may show up on the line. In some implementations, after user finishes drawing the length notation are no longer shown. In other implementations, the length notations may remain after completion of the drawing.

Generally, in one example, the steps to conduct the search may involve the following: (1) The user may draw a custom polygon on the map. (2) The user may enter some property attributes, such as bedrooms, bathrooms, square footage, etc. (3) The search may return joint spatial and non-spatial results onto a map results page with the custom polygon outline displayed. (4) The user can delete specific listings in list results and the corresponding changes may be reflected in the map. In some embodiments, the custom polygon outline may still be displayed. (5) The user can repeat steps 1-4 additional times for multiple shapes. In some embodiments, a user may repeat steps 1-4 two additional times for a total of three shapes. The user can mix radius and polygon shapes. In some cases, there may be a set total of shapes, such as 3, or the number of shapes may be unlimited. (6) The user can redo the search, save this search, or go to other existing functions, such as driving directions, CMA, etc.

In some embodiments, the map results image may be interactive, allowing the user to resize, reshape, or move their custom polygon and refine their search based on new spatial information, keeping the non-spatial filter the same, and still not display any "hidden" deselected properties. If the map results page is not image interactive, then a link back to an interactive map may be provided.

In some embodiments, a search results page may have the following sub-tabs or provide access to the following features: list view, picture view, and map view. Each view may show joint query of custom shape filter and selected property listing attributes. The map view may show (interactive) map with a list of properties. In some instances, default columns shown for list of properties may include: checkbox, status, address, list price, bed, bath, square footage, DOM, city, and hide. A map search may be an extension of other search methods. Pre-populated fields and functionality like "preview count" can be carried across other search features, such as a quick search or an advanced search. The quick search filters may be automatically applied to a map search within the session.

Saving Custom Polygon Search

A user may be able to save a joint query of custom polygon and listing attributes. If only the custom polygon is defined, then only the spatial filter may be saved. The user interface may include a user interactive field for saving a search. For example, a saved search drop down could include a "thumbnail" of the shape and map location.

Prior to saving a polygon search, a user may have completed a custom polygon search and may be showing results from either the spatial search alone, or the joint filter of spatial and non-spatial attributes. The polygon tool may be activated.

The user may click a "save search" option. If the polygon tool is activated, the MLS could save this as a spatial query along with its non-spatial data filters. A user may select a save search option from any number of locations, such as a search results screen, or a search screen. A saved search list may be provided. In some instances, the saved search list may be provided as a drop down list.

Example of information relating to a search that may be saved when the search is saved may include the latitude and longitude of the start of the polygon, and the lengths and/or orientations of the sides, or the latitude and longitude of each point of the polygon. In some instances, a limit may be provided on the number of shapes that may be stored (radius or polygon). Alternatively, an unlimited number of shapes may be stored. A saved search may also include non-spatial data associated with the saved search. Saved joint filters are stored in existing "Saved Search" list and can be manipulated.

2. Saved Searches

A general set of steps that may be utilized in handling saved search is outlined below:

| Recall Saved Search | Edit Saved Search for Re-Saving as new search (from Search Results) Currently not asking for ability to redraw the shape | Manage Saved Search (from Saved Search screen) Edit Search Rename Search Copy Search Change Client Delete Search Add/Edit Email Alert View Alert History Delete Email Alert |
| --- | --- | --- |

Recall Saved Map Search

Standard subscribers (or any other users) may be able to recall saved searches by clicking into a named search in "Saved Searches", or any other similar feature. Prior to this, a spatial or joint spatial and non-spatial search may have been saved by the user and stored in a MLS software. Stored fields may include custom radius or custom polygon fields. When the searches were saved, the user or system may have selected a name for the saved search.

When user clicks on a named search with stored spatial filters, the user may be directed to a map view of the search results, and may be able to see stored filters (both spatial and non-spatial) and the listings that fit those filters.

The user actions may be as follows: (1) The user may click on or otherwise access a "saved search." (2) The user may enter a "saved search" view. (3) The user may click on, or otherwise select, a named search. (4) If the saved search is a spatial filter, the user may be directed to a map view of a search results page showing specifications in the above examples. For an embodiment with a spatial filter with custom radius plus optional data fields, the map results page may show a map with the custom circle outlined, pins showing the listings that meet criteria on the map, and a list of properties.

For an embodiment with a spatial filter with custom polygon plus optional data fields, the map results page may show a map with the custom polygon outlined, pins showing the listings that meet criteria on the map, and a list of properties.

In some embodiments, there may be various types of saved searches. For example, there may be a combined saved search, which may include spatial and non-spatial features. There may also be a saved search that may only include non-spatial criteria or a map search which may include only spatial criteria. These searches may be saved, and may or may not be recalled with similar functionality. In some implementations of spatial and non-spatial search, the results may be presented, instead of or in addition to the usual UI presentation, in an email sent either to the agent who created the search or to third parties, such as his or her clients. In some embodiments, a constraint may be that there are no email notifications for joint spatial searches.

Edit/Resave Saved Map Search

Standard subscribers (or other users) may be able to edit an existing saved search by clicking a "save search" button or providing any other input indicating a "save search" feature. Prior to this, a spatial or joint spatial and non-spatial search may have been saved by the user and stored in a MLS software. Stored fields can include custom radius or custom polygon fields in addition to any non-spatial fields.

Once inside a map view of search results, or a similar page, users can edit data fields to refine their search. A filter can apply upon clicking a search button or any other user interactive device that may indicate a search. A user can also save this new set of filters as a new saved search. Some embodiments may enable shapes to be edited from recalled map search, while other embodiments may not enable a user to edit shapes.

In some cases a user may be able to interact with a custom shape, such as a circle or polygon or other shape. For example, a user may be able to resize or move the custom shape. Some embodiments may include right click functions like clear, edit/reshape, etc.

The user actions may be as follows: (1) The user may edit data fields to refine a map view of a search results page. (2) The user may click a "save search" button, or perform a similar action. (3) The user may enter a new name for this search. A new Saved Search may be created with the updated spatial and non-spatial/data criteria.

For an embodiment with a spatial filter with custom radius plus optional data fields, the map results page may show a map with the custom circle outlined, pins showing the listings that meet criteria on the map, and a list of properties.

For an embodiment with a spatial filter with custom polygon plus optional data fields, the map results page may show a map with the custom polygon outlined, pins showing the listings that meet criteria on the map, and a list of properties.

Manage "Saved Search" for Geo-Filtered Searches (from Saved Search View)

Standard subscribers (or other users) may be able to manage their saved search from a saved searches view. Various activities that may take may include: edit search, rename search, copy search, change client, delete search, add/edit email alert, view alert history, and delete email alert.

The various activities may cause the following to occur:
Rename Search only renames the title of the search
Copy Search must copy over all spatial and non-spatial data
Change Client only updates the client
Delete Search deletes all spatial and non-spatial data
Add/Edit Email Alert updates the alert information
View Alert History displays the alert history
Delete Email Alert deletes the alert information An edit search option may be further described, and may display all spatial and non-spatial data. Prior to editing a search, a spatial or joint spatial and non-spatial search may have been saved by the user and stored in a MLS software. Stored fields may include custom radius or custom polygon fields. When the user selects an edit search option (e.g., from a drop down list from the saved searches view), the user may see the edit saved search mode with a map being displayed that contains the custom shape that was previously saved. The user can then edit the non-spatial fields and re-save the search.

In some cases a user may be able to interact with a custom shape, such as a circle or polygon or other shape. For example, a user may be able to resize or move the custom shape.

The user actions may be as follows: (1) The user may be in a saved searches page, and may select an "edit search" option to view a saved search with spatial and non-spatial information. (2) The user may edit non-spatial fields. (3) The user may be able to readjust a custom shape—click and drag the radius of the circle or click and drag the points of the polygon to reshape the spatial filter, enter values to reshape or resize the spatial filter. (4) The user may click a "save search" option.

IV. Driving Tour Features

In accordance with another aspect of the invention, an MLS system may include optimized multi-point driving directions. In some instances, the multiple points on a driving tour may represent real property from a search. Once a user has conducted a search, the MLS system may be able to provide driving directions for the search results. Directions may be generated for multiple listings. The search results may be within one or more specified areas on a map. The driving directions may allow a user to travel between the search results that were within the one or more specified areas on the map, and may be displayed on the map.

Figure 9:
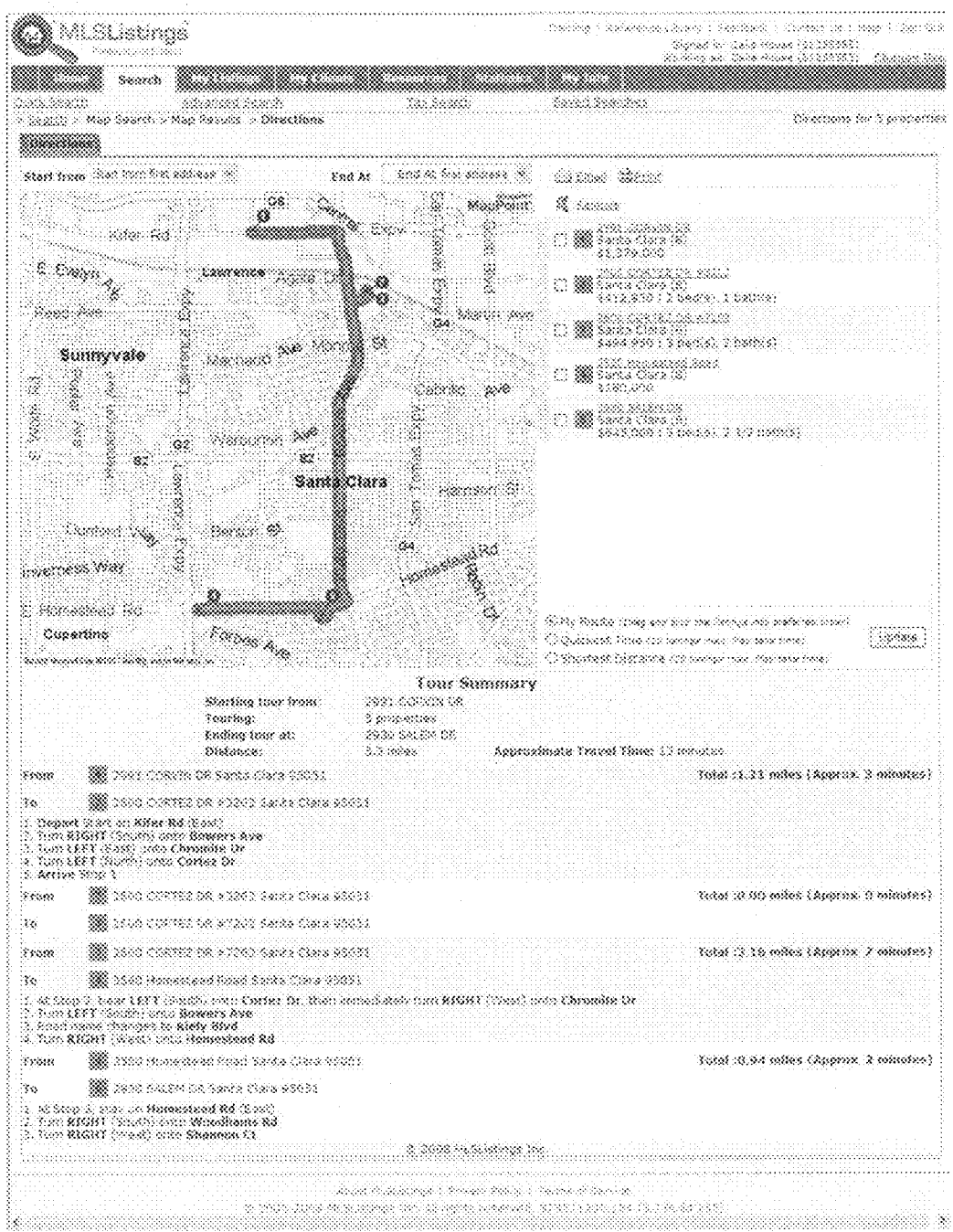
FIG. 9 shows an example of a geographic map with a travel route connecting multiple destinations.

FIG. 9 shows an example of a geographic map with a travel route connecting multiple destinations. For example, a destination list may be displayed showing two or more real property listings. The user interface may also include a geographic map showing a travel route connecting two or more destination markers that may correspond to the real property listings in the destination list. The travel route for a driving tour may indicate a selected start point and may visit each destination marker. Driving directions may also be provided, corresponding to the travel route. A tour summary may show driving directions for the travel route.

In some embodiments, the real property listings in the destination list may be numbered, and the destination markers along the travel route may also be numbered accordingly. In some instances, the real property listings on the destination list may be flagged by status. The destination markers may also include visual indicators (e.g., color, shape) that may correspond to the status of the real property listings. Some examples of the status may include Active (currently being marketed), Pending (in escrow), Sold (property is already sold; listing is retained as a record of the transaction), and Expired (a listing of a property that did not sell during the term of the listing agreement between the listing agent and the seller(s)).

Driving directions may include any of the features as mentioned previously in U.S. Patent Publication No. 2008/0168369, and which is incorporated herein by reference. For instance, driving directions may allow a user to specify a user customized route, a quickest time route, or a shortest distance route.

When a route can not be calculated as a result of listing address, an error message can specify which listing address(es) are problematic A user may specify a default route. Once a user has selected "my route," that can be made into the new default. Alternatively, when a user clicks away from window, a default may be the quickest route.

V. Additional Features

A MLS software may include any additional map features known or later developed in the art. See, e.g., U.S. Pat. No. 7,174,301 and U.S. Patent Publication No. 2009/0132316, which are hereby incorporated by reference in their entirety.

For example, listings, such as real property listings, may be flagged on a map results page by status. For example, after a search has been conducted, a destination list may be displayed on the map results page. The destination list may display real property listings that fit the user-specified spatial and/or non-spatial criteria. The destination list may include some sort of visual indicator or marker that may indicate the status of the real property listing. The visual indicator or marker may include features such as colors, size, order, or shape. The corresponding visual indicators or markers may be provided on a destination indicator or marker on a geographic map. Thus, on a geographic map, the status of the real property search results may be visually displayed.

Another example of an additional feature may be displaying a map image on property flyers. An MLS system may enable an image of the map and/or real property to be automatically cached to flyers for a real property listing. Thus an image (e.g., jpeg) may be shown on flyers (caching).

In some embodiments, an MLS software may allow rollover pop ups displaying short list of property listing information. For example, a pointing device indicator, such as a mouse pointer, may be provided over a destination, and may cause a pop-up within the same window or new window to be displayed. The pop-up may include additional information about the destination. In some instances, the pop-up may include additional information, such as information about a travel route or the surrounding area. The pop-up may include additional geographic information about the surrounding area such as school district boundaries, demographic information, heat maps, parcel boundaries, tax information, and so forth.

In some instances, an MLS brand or logo can be carried through all the page views and any pop-up windows. Thus, branding of the MLS system may be provided.

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents.

What is claimed is:

1. A graphical user interface showing real estate search results on a display device, the graphical user interface comprising:
   a multiple listing service (MLS) listing having a plurality of real property listings, each real property listing of the plurality of real property listings having a street address;
   a geographic map having at least one status flag showing and visually distinguishing listing availability between one or more of the following listing status categories: active, pending, sold, expired, canceled, or withdrawn, the at least one status flag corresponding to a location of at least one real property listing of the plurality of real property listings in the MLS listing; and
   a plurality of user-drawn MLS listing search areas displayed on the geographic map, in context to non-search areas that are also displayed on the geographic map, wherein the plurality of user-drawn MLS listing search areas define a targeted area of interest that includes each real property listing of the plurality of real property listings and that covers one or more neighborhoods or portions thereof within the geographic map, wherein the at least one status flag corresponding to the at least one real property listing is displayed within a user-drawn MLS listing search area of the plurality of user-drawn MLS listing search areas, and wherein the plurality of user-drawn MLS listing search areas are discontinuous, and
   wherein the graphical user interface is configured such that the at least one real property listing of the plurality of real property listings of the MLS listing is associated with a first user-drawn MLS listing search area of the plurality of user-drawn MLS listing search areas and wherein a resizing of the first user-drawn MLS listing search area of the plurality of user-drawn MLS listing search areas results in an update of the at least one real property listing of the plurality of real property listings in the MLS listing and the corresponding at least one status flag within the resized user-drawn MLS listing search area displayed on the geographic map.

2. The graphical user interface of claim 1 wherein the MLS listing search area is defined by at least one of the following search boundaries: a circle, a polygon, or a custom shape.

3. The graphical user interface of claim 1 further comprising additional geographic information that is integrated into the geographic map.

4. The graphical user interface of claim 3 wherein the additional geographic information includes at least one of the following: school district boundaries, demographic information, heat maps, parcel boundaries, tax information.

5. The graphical user interface of claim 3 wherein the additional geographic information is displayed as data layers.

6. The graphical user interface of claim 1 wherein selecting a status flag causes additional information to be displayed about the real property listing denoted by the status flag.

7. The graphical user interface of claim 1 wherein the user-drawn areas are delineated by visible boundaries.

8. The graphical user interface of claim 1 wherein a size of the user-drawn areas is determined by a drawn input by the user.

9. The graphical user interface of claim 1 wherein the user-drawn areas include a shape that was free-handed by the user.

10. The method of claim 1 wherein the at least one status flag has a uniform shape and wherein the at least one status flag is color-coded to represent and visually distinguish the listing availability category.

11. A multiple listing system graphical user interface comprising:
    a search entry interface with a plurality of real property search criteria to be determined by a user;
    a MLS list with a plurality of real property listings each having a street address that meets the real property search criteria;
    a geographic map adjacent to the search entry interface having at least one status flag showing and visually distinguishing listing availability of at least one real property listing of the plurality of real property listings between one or more of the following listing status categories: active, pending, sold, expired, canceled, or withdrawn, the at least one status flag corresponding to a location of the at least one real property listing in the MLS list; and
    a plurality of user-drawn spatial search filters displayed on the geographic map, in context to non-search areas that are also displayed on the geographic map, wherein the plurality of user-drawn MLS listing search areas define a targeted area of interest that covers one or more neighborhoods or portions thereof within the geographic map, wherein the at least one status flag corresponding to the at least one real property listing of the plurality of real property listings is displayed within a user-drawn spatial search filter of the plurality of user-drawn spatial search filters, wherein the plurality of user-drawn spatial search filters are discontinuous,
    wherein a resizing of a user-drawn spatial search filter of the plurality of user-drawn spatial search filters displayed within the geographic map results in an update of the plurality of real property listings in the MLS list.

12. The multiple listing system graphical user interface of claim 11 wherein at least one spatial search filter of the plurality of spatial search filters is drawn free-hand by the user.

13. The multiple listing system graphical user interface of claim 11 wherein the geographic map is integrated with a pre-existing map feature, and with a pre-existing toolbar.

14. The multiple listing system graphical user interface of claim 11 wherein the geographic map includes viewing options for at least one of the following: 2D view, 3D view, road view, aerial view, or hybrid view.

15. The multiple listing system graphical user interface of claim 11 wherein the geographic map further includes a travel route for a driving tour indicating a selected start point and visiting each status flag.

16. The multiple listing system graphical user interface of claim 15 wherein the geographic map further includes a tour summary showing driving directions for the travel route.

17. A method for searching multiple listings comprising:
displaying a geographic map on an interactive display device;
receiving, from a user, a plurality of drawn inputs defining a plurality of user-drawn MLS listing search areas that include a plurality of real property listings, wherein the plurality of user-drawn MLS listing search areas are discontinuous;
displaying, on the geographic map, the plurality of user-drawn MLS listing search areas for defining a targeted area of interest that covers one or more neighborhoods or portions thereof, wherein non-search areas are also displayed on the geographic map such that the plurality of user-drawn MLS listing search areas are displayed in context of the geographic map which includes search areas and non-search areas;
receiving, from the user, one or more search criteria; and
displaying, on the geographic map, the plurality of user-drawn MLS listing search areas and at least one status flag corresponding to a real property listing of the plurality of real property listings that meets the one or more search criteria and is displayed within the MLS listing search area, wherein the status flag shows and visually distinguishes listing availability of the real property listing between one or more of the following listing status categories: active, pending, sold, expired, canceled, or withdrawn, the at least one status flag corresponding to a location of the real property listing, wherein a resizing of a user-drawn MLS listing search area of the plurality of user-drawn MLS listing search areas displayed on the geographic map results in an update of the plurality of real property listings.

18. The method of claim 17 wherein the drawn input defining the user-drawn MLS listing search area includes at least one of the following: MLS listing search area coordinates, MLS listing search area radius, MLS listing search area shape, clicking and dragging the geographic map.

19. The method of claim 17 further comprising saving the MLS listing search area.

20. The method of claim 19 further comprising modifying a saved MLS listing search area.

21. The method of claim 20 wherein a size or shape of the user-drawn area is resized by clicking and dragging at least one boundary of the user-drawn area.

22. The method of claim 20 further comprising:
updating the at least one status flag displayed within the resized user-drawn area;
displaying, on the interactive display device, a MLS list with at least one real property listing, wherein the at least one status flag corresponds to a location of the at least one real property listing; and
automatically updating, on the interactive display device, the MLS list to reflect an updated real property listing corresponding to the updated status flag displayed within the resized user-drawn area.

23. The method of claim 20 wherein the modification to the saved listing search area is performed via a free-hand-drawn input by the user.

24. The method of claim 17 wherein the one or more search criteria relates to a real property listing attribute.

25. The method of claim 17 further comprising adjusting at least one line of the user-drawn MLS listing search area to conform to a street based on a proximity of the at least one line to the street.

26. A non-transitory computer readable medium containing program instructions for searching real estate listings within a specified geographic filter comprising:
computer code that displays a geographic map on an interactive display device;
computer code that receives, from a user, a drawn input for determining the specified geographic filter;
computer code that receives, from the user, one or more search criteria;
computer code that displays, on the geographic map, at least one status flag that meets the one or more search criteria, the at least one status flag showing and visually distinguishing listing availability of at least one real property listing between one or more of the following listing status categories: active, pending, sold, expired, canceled, or withdrawn, the at least one status flag corresponding to a location of the at least one real property listing;
computer code that displays a plurality of discontinuous, user-drawn areas defined by the specified geographic filter for defining a targeted area of interest that covers one or more neighborhoods or portions thereof, wherein the at least one status flag falls within a user-drawn area of the plurality of user-drawn areas, and wherein the plurality of user-drawn areas are displayed in a geographic map that also displays non-search areas;
computer code that displays a MLS list comprising the at least one real property listing with a street address corresponding to the at least one status flag;
computer code for receiving a resizing of a user-drawn area of the plurality of user-drawn areas displayed within the geographic map; and
computer code for updating the MLS list based on the resizing of the user-drawn area.

27. The non-transitory computer readable medium of claim 26 wherein the user is at least one of the following: a real estate agent, a real property appraiser, a property seller, or a prospective customer.

28. The non-transitory computer readable medium of claim 26 wherein the order that objects are displayed or downloaded depends on a user connection speed.

* * * * *